US012333568B2

(12) United States Patent
Wilson

(10) Patent No.: US 12,333,568 B2
(45) Date of Patent: Jun. 17, 2025

(54) SYSTEMS AND METHODS FOR OPTING-OUT OF TARGETED ADVERTISING IN AN ONLINE ADVERTISING ENVIRONMENT

(71) Applicant: Yahoo Ad Tech LLC, New York, NY (US)

(72) Inventor: Jeffrey Todd Wilson, Ashburn, VA (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

(21) Appl. No.: 18/489,219

(22) Filed: Oct. 18, 2023

(65) Prior Publication Data

US 2024/0046309 A1   Feb. 8, 2024

Related U.S. Application Data

(63) Continuation of application No. 16/576,351, filed on Sep. 19, 2019, now Pat. No. 11,830,035, which is a
(Continued)

(51) Int. Cl.
*G06Q 30/02* (2023.01)
*G06Q 30/0251* (2023.01)
(Continued)

(52) U.S. Cl.
CPC ......... *G06Q 30/0257* (2013.01); *H04L 67/02* (2013.01); *H04L 67/52* (2022.05)

(58) Field of Classification Search
CPC ...... G06Q 30/0257; H04L 67/52; H04L 67/02
See application file for complete search history.

(56) References Cited

U.S. PATENT DOCUMENTS 6,418,472 B1   7/2002 Mi et al.
6,463,533 B1   10/2002 Calamera et al.
(Continued)

OTHER PUBLICATIONS

Fielding et al., "Hypertext Transfer Protocol—HTTP/1.1", Network Working Group Request for Comments No. 2616, originally published by The Internet Society, Jun. 1999, maintained online by The Internet Engineering Task Force, on line at www.ietf.org.

*Primary Examiner* — Scott C Anderson
(74) *Attorney, Agent, or Firm* — Bookoff McAndrews, PLLC

(57) ABSTRACT

Systems and methods are disclosed for opting-out of targeted advertising in online advertising environments. One method includes receiving an opt-out verification request, the opt-out verification including an IP address of a user device and HTTP header fields of an HTTP request of the user device; determining a geographic area of the user device based on the IP address of the user device; accessing an opt-out database having entries of user devices that opted-out of receiving targeted advertising based on at least one HTTP header field of the HTTP request; determining whether the user device has opted-out of receiving targeted advertising based on the determined geographic area of the user device, the HTTP header fields of the HTTP quest, and the entries of user devices of the opt-out database; and transmitting a verification acknowledgement when the user device is determined to have opted-out of receiving targeted advertising.

20 Claims, 6 Drawing Sheets

Related U.S. Application Data continuation of application No. 14/619,753, filed on Feb. 11, 2015, now Pat. No. 10,460,349.

(51) Int. Cl.
*H04L 67/02* (2022.01)
*H04L 67/52* (2022.01)

(56) References Cited

U.S. PATENT DOCUMENTS

| | | | |
|---|---|---|---|
| 9,165,124 B1 | 10/2015 | Gurevich et al. | |
| 9,225,694 B1* | 12/2015 | Reitzen | H04L 63/105 |
| 2005/0256766 A1 | 11/2005 | Garcia et al. | |
| 2007/0179863 A1 | 8/2007 | Stoll | |
| 2007/0180031 A1 | 8/2007 | Stern et al. | |
| 2007/0266439 A1 | 11/2007 | Kraft | |
| 2008/0147491 A1 | 6/2008 | Robinson et al. | |
| 2009/0216642 A1 | 8/2009 | Ho et al. | |
| 2010/0042930 A1* | 2/2010 | Pritchard | G06Q 30/02 |
| | | | 709/221 |
| 2010/0082801 A1 | 4/2010 | Patel et al. | |
| 2011/0022681 A1 | 1/2011 | Simeonov | |
| 2011/0029385 A1 | 2/2011 | Engel et al. | |
| 2011/0053618 A1 | 3/2011 | Lin et al. | |
| 2011/0196725 A1 | 8/2011 | Malcolmson et al. | |
| 2011/0321167 A1 | 12/2011 | Wu et al. | |
| 2012/0023547 A1* | 1/2012 | Maxson | H04L 63/0407 |
| | | | 726/1 |
| 2013/0035994 A1 | 2/2013 | Pattan et al. | |
| 2013/0054010 A1* | 2/2013 | Holman | G06Q 50/01 |
| | | | 700/232 |
| 2013/0117081 A1* | 5/2013 | Wilkins | G06Q 30/0248 |
| | | | 705/14.4 |
| 2013/0268357 A1* | 10/2013 | Heath | G06Q 10/10 |
| | | | 726/26 |
| 2013/0346472 A1 | 12/2013 | Wheeldon | |
| 2014/0129670 A1* | 5/2014 | Oliver | G06F 21/10 |
| | | | 709/217 |
| 2015/0365473 A1* | 12/2015 | Zuerner | H04L 67/104 |
| | | | 713/168 |

* cited by examiner

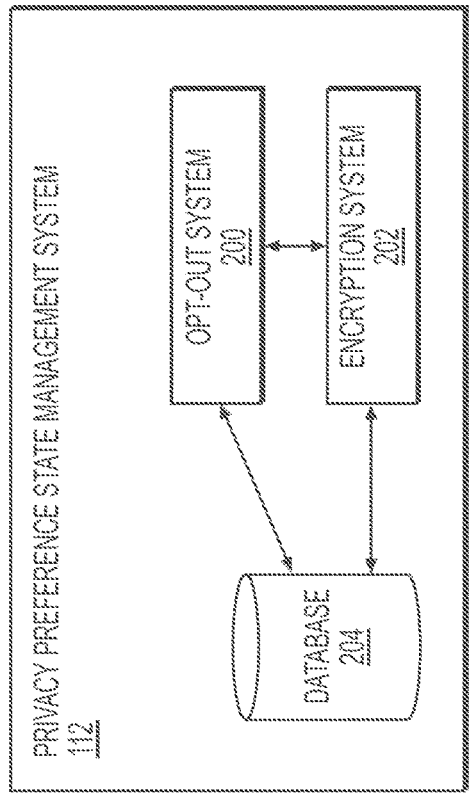

SYSTEMS AND METHODS FOR OPTING-OUT OF TARGETED ADVERTISING IN AN ONLINE ADVERTISING ENVIRONMENT

CROSS-REFERENCE TO RELATED APPLICATION(S)

This application is a continuation of and claims the benefit of priority to pending U.S. patent application Ser. No. 16/576,351, filed Sep. 19, 2019, which is a continuation of and claims the benefit of priority to U.S. patent application Ser. No. 14/619,753, filed Feb. 11, 2015, now U.S. Pat. No. 10,460,349, granted Oct. 29, 2019, each of which is incorporated herein by reference in its entirety.

TECHNICAL FIELD

The present disclosure relates generally to consumer privacy techniques and related systems and methods. More particularly, and without limitation, the present disclosure relates to systems and methods for opting-out of targeted advertising in online advertising environments.

BACKGROUND

Due to the vast and increasing amount of traffic generated by consumers on the Internet, businesses continue to seek more effective means to advertise their goods and services online. An advertiser is generally a merchant of goods and/or services willing to pay to have its ads presented to consumers online. The advertiser may use its own data about consumers and/or a data provider to determine which consumers to present the ads to. Such consumer data may include demographic information, preferences, interests, etc., which is used to select and serve a particular ad to a particular consumer.

In an effort to spend their online advertising budgets on those consumers who will most likely be interested in their ads, advertisers develop "ad campaigns" or marketing plans that identify certain types of consumers as targets for given products or services. In other cases, advertisers may be unsure of what types of consumers are most likely to respond to a given product and/or ad, and may wish to gather specific information about the consumers viewing various types of websites and responding to their ads. The advertisers may then develop a targeted ad campaign or marketing strategy (e.g., for a particular, good service, and/or ad) based on the gathered information.

Implementing targeted ad campaigns requires the audience intelligence providers to gather and process information about consumers, which is known as "profiling." One way intelligence providers gather consumer information is by tracking consumers as they surf the Internet using "cookies." Generally, a cookie is a small piece of data placed on the user's browser when the user visits a website belonging to ad network. The cookie usually contains, among other things, a unique identifier associated with the user. The cookie may contain other information, such as date and time information, an estimated zip code of the user, and browser history information. The cookie is stored for a specified time and returned whenever the user subsequently visits that website or another website in the ad network. By compiling and analyzing cookie information associated with a particular user gathered across multiple websites, a "user profile" indicating various attributes, preferences, and/or interests of the consumer can be built. This profile may then be used by ad networks and/or ad exchanges to support targeted ad campaigns. Of course, other consumer tracking methods may be used by intelligence providers to gather information about consumers and build user profiles.

Some people find such consumer tracking and profiling methods employed by online advertisers to be intrusive or invasive. These privacy concerns have encouraged online advertising companies to form self-regulating cooperatives to ensure that consumer privacy is protected in the advertising process. One such cooperative is the Network Advertising Initiative ("NAI"), which provides various tools for consumers to educate themselves in relation to online advertising and protect their privacy online. For example, NAI's website allows users to access information about how targeted advertising works, the privacy policy of the ad networks participating in the cooperative, and other related information. In addition, NAI's website provides a tool allowing the user to selectively "opt-out" of targeted advertising by one or more of the participating networks.

Generally, opting-out is a process by which a user may avoid receiving further targeted advertising. Usually this involves replacing the unique identifier in the cookie on the user's browser with some type of opt-out identifier, creating an opt-out cookie. When the user subsequently visits a website in the ad network, the opt-out cookie is returned, and the website can no longer track the user's browser history, build or update user profiles, etc. Moreover, to the extent that an ad is requested and delivered to the user, the ad is generic and not selected based on any particular information about the user.

Another way of opting-out is through the use of the Do-Not-Track ("DNT") field in the HTTP header of a web browser. However, the DNT header may not be user-effectuated because a web browser, a router, computer, Internet service provider, and/or other network appliances may automatically set the DNT header to not track the consumer without the consumer's consent. Moreover, the DNT header is a cooperative solution based on an honor system and, therefore, not universally accepted. Each of these opting-out techniques has various drawbacks.

SUMMARY OF THE DISCLOSURE

Embodiments disclose systems and methods for opting-out of targeted advertising in online advertising environments.

According to certain embodiments, computer-implemented methods are disclosed for opting-out of targeted advertising in online advertising environments. One method includes: receiving, at a server, an opt-out verification request, the opt-out verification including an IP address of a user device and HTTP header fields of an HTTP request of the user device; determining, by the server, a geographic area of the user device based on the IP address of the user device; accessing, by the server, an opt-out database having entries of user devices that opted-out of receiving targeted advertising based on at least one HTTP header field of the HTTP request; determining, by the server, whether the user device has opted-out of receiving targeted advertising based on the determined geographic area of the user device, the HTTP header fields of the HTTP quest, and the entries of user devices of the opt-out database; and transmitting, by the server, a verification acknowledgement when the user device is determined to have opted-out of receiving targeted advertising.

According to certain embodiments, systems are disclosed for opting-out of targeted advertising in online advertising environments. One system includes a data storage device that stores instructions for opting-out of targeted advertising in online advertising environments; and a processor configured to execute the instructions to perform a method including: receiving an opt-out verification request, the opt-out verification including an IP address of a user device and HTTP header fields of an HTTP request of the user device; determining a geographic area of the user device based on the IP address of the user device; accessing an opt-out database having entries of user devices that opted-out of receiving targeted advertising based on at least one HTTP header field of the HTTP request; determining whether the user device has opted-out of receiving targeted advertising based on the determined geographic area of the user device, the HTTP header fields of the HTTP quest, and the entries of user devices of the opt-out database; and transmitting a verification acknowledgement when the user device is determined to have opted-out of receiving targeted advertising.

According to certain embodiments, non-transitory computer readable media are disclosed that store instructions that, when executed by a computer, cause the computer to perform a method for opting-out of targeted advertising in online advertising environments. One computer-readable medium includes the method of: receiving, at a server, an opt-out verification request, the opt-out verification including an IP address of a user device and HTTP header fields of an HTTP request of the user device; determining, by the server, a geographic area of the user device based on the IP address of the user device; accessing, by the server, an opt-out database having entries of user devices that opted-out of receiving targeted advertising based on at least one HTTP header field of the HTTP request; determining, by the server, whether the user device has opted-out of receiving targeted advertising based on the determined geographic area of the user device, the HTTP header fields of the HTTP quest, and the entries of user devices of the opt-out database; and transmitting, by the server, a verification acknowledgement when the user device is determined to have opted-out of receiving targeted advertising.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2 depicts an exemplary representation of privacy preference state management system, according to exemplary embodiments of the present disclosure;

FIG. 3 depicts exemplary opt-out data contained in an opt-out database, according to exemplary embodiments of the present disclosure;

DETAILED DESCRIPTION OF THE EMBODIMENTS

Figure 1:
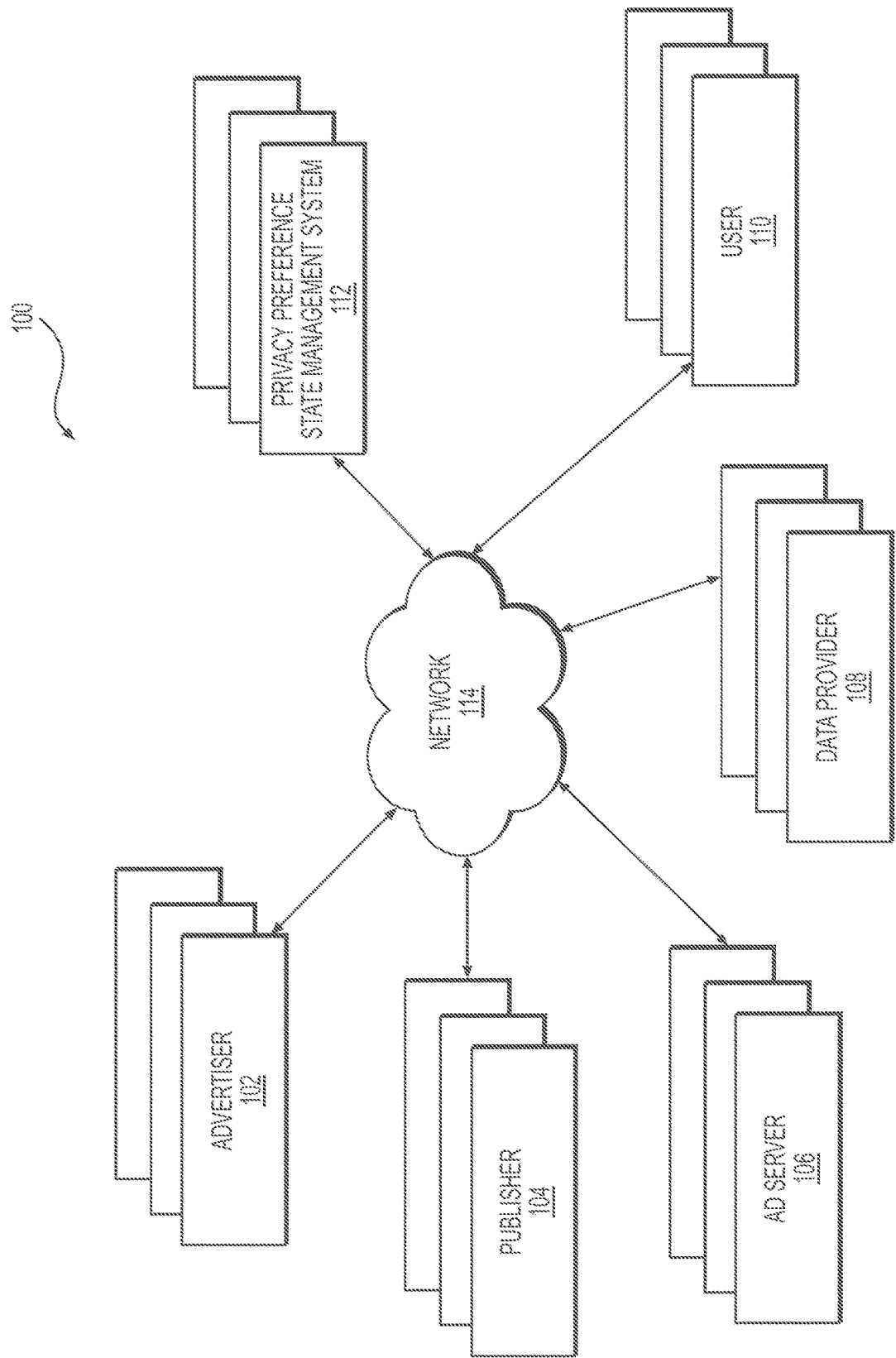
FIG. 1 depicts an exemplary online advertising environment in which consumer privacy may be provided, according to exemplary embodiments of the present disclosure.

Reference will now be made in detail to exemplary embodiments, examples of which are illustrated in the accompanying drawings. Wherever possible, the same reference numerals will be used throughout the drawings to refer to the same or like parts.

FIG. 1 depicts an exemplary online advertising environment 100 in which consumer privacy may be provided, consistent with the disclosed embodiments. As shown, environment 100 may include advertisers 102, publishers 104, ad servers 106, data providers 108, users 110, and privacy preference state management system 112, in communication via a network 114. Advertisers 102, publishers 104, ad servers 106, data providers 108, users 110, and a privacy preference state management system 112 may include one or more computing devices, such as a personal computer, a desktop computer, a laptop computer, a handheld computing device, a mobile phone, smartphone, a server, distributed server system, and/or any other type of computing device. Network 114 may include any combination of networks, such as, for example, the Internet, a dedicated intranet, or any other type of electronic communication network known in the art.

Advertisers 102 may include one or more computing devices associated with any business entities having online advertisements, such as banner ads, pop-ups, etc. desired to be delivered to online users. Advertisers 102 may interact with publishers 104, ad servers 106, and/or data providers 108 via network 114 to communicate, among other things, ad information, targeting information, consumer information, ad campaign information, and/or other related advertising information.

Publishers 104 may include one or more computing devices associated with any business entities having inventories of available online advertising space. For example, publishers 104 may include online content providers, search engines, e-mail services, content websites, news websites, or any other or websites attracting the online traffic of users 110. Publishers 104 may interact with advertisers 102 and/or ad servers 106 over network 114 to communicate site information, demographic information, browser cookie information, user information, and/or any other information in connection with requesting ads for available advertising space on their websites. For example, in response to user devices 110 accessing websites associated with publishers 104, the web browsers of the user devices 110 of may generate and send to ad servers 106 over network 112 ad requests requesting ad servers 106 to serve ads to fill the available ad space on their websites. The ad requests may contain, for example, cookie information (e.g., a unique identifier), user information, and/or any other information that may be used to fulfill an ad request.

Ad servers 106 may include one or more computing devices associated with any business entities that store and/or process advertising information (e.g., ad campaign information) received from advertisers 102 and/or ad inventory information received from publishers 104, either directly or indirectly. For example, ad servers 106 may include one or more remote ad networks configured to serve ads in response to ad requests from publishers 104, based on the advertising information received from advertisers 102 and/or on ad request information received from publishers 104. Ad servers 106 may also be configured to serve ads based on contextual targeting of websites, search results, and/or user profile information. For example, in response to receiving an ad request from a publisher 104, ad servers 106 may facilitate bids on the available advertising space on the webpage of the publisher 104.

Data providers 108 may represent any entities that collect information about an online audience, such as users of user devices 110, and provide the collected information to ad servers 106, advertisers 102, ad exchanges, and/or other entities for use in online advertising. For example, data providers 108 may include server computing systems associated with websites of publishers 104, ad servers 106, content providers, financial institutions, or other entities that track online users 110 using browser cookies and/or other techniques. In some embodiments, data providers 108 may collect, index, and segment demographic and other information about users to build user profiles. The user profiles may then be provided to ad servers 106, advertisers 102, and/or ad exchanges to target users with online advertisements tailored to their interests.

The privacy preference state management system 112 may include one or more computing devices associated with any entities responsible ensuring consumer privacy standards in relation to online advertising. For example, privacy preference state management system 112 may include self-regulating cooperatives of advertising networks (e.g., networks of ad servers 106). The privacy preference state management system 112 may issue an opt-out of advertisement, which may be a "trusted" opt-out indicator because the indicator has been verified to be up-to-date and/or at the request of a consumer FIG. 2 depicts an exemplary representation of privacy preference state management system 112, consistent with the disclosed embodiments. Although shown embodied as a single entity connected to network 114, privacy preference state management system 112 may alternatively or additionally by implemented by one or more other entities on network 114. As shown in FIG. 2, privacy preference state management system 112 may include an opt-out system 200, an encryption system 202, and an opt-out database 204.

In one embodiment, opt-out system 200 may include one or more servers configured to assist consumers in opting-out of targeted online advertising and/or behavioral tracking. For example, opt-out system 200 may operate and/or host a webpage configured to receive over network 114 an opt-out request from a user device 110 to opt-out of targeted advertising by one or more ad networks and/or ad servers 106 associated with opt-out system 200.

The opt-out request may also include an IP address of the user device 110 that transmitted the request and a user-agent value of the web browser on the user device 110 that transmitted the request. In response to receiving the opt-out request, the opt-out system 200 may examine the IP address to determine a geographic area in which the user device 110 resides.

The opt-out system 200 may then generate an opt-out value based on one or more of the user-agent value, the determined geographic area, and/or a timestamp of the opt-out request. For example, the opt-out system 200 may generate an opt-out value based on the user-agent, geographic area, and timestamp, and store the opt-out value in the opt-out database 204. Alternatively, the opt-out system 200 may hash the user-agent value, and generate the opt-out value based on one or more of the hashed user-agent value, determined geographic area, and/or timestamp.

The opt-out system 200 may also encrypt the opt-out value via the encryption system 202. The encryption system 202, upon receiving the opt-out value from opt-out system 200, may encrypt the opt-out value using, for example, a strong key and/or asymmetric key pairs. The encryption system 202 may then store the encrypted opt-out value in the opt-out database 204.

An opt-out response including the opt-out value and/or the encrypted opt-out value may then be transmitted to the user device 110 that transmitted the opt-out request by either the opt-out system 200 or the encryption system 202. Along with the opt-out value and/or encrypted opt-out value, an opt-out request honored flag may be transmitted to the user device 110. An opt-out response may include a message to indicate a status of the response, such as, "your opt-out is valid," "your opt-out is invalid/corrupted—please refresh," and/or "your opt-out will expire in 7 days, please refresh."

In response, opt-out system 200 may also instruct the browser to delete from the user's browser any cookies associated with selected ad networks and/or ad servers 106, delete the unique identifiers contained in the cookies, and/or store opt-out cookies for the selected ad servers or networks on the user's browser, thereby preventing further targeted advertising directed at a user of user device 110. Alternatively or additionally, opt-out system 200 may instruct selected ad networks and/or ad servers 106, publishers 104, data providers 108, ad exchanges, etc., to delete any stored user profile information associated with a user and stop online behavioral tracking of a user.

FIG. 3 depicts an exemplary opt-out data 300 contained in opt-out database 204, consistent with the disclosed embodiments. Opt-out data 300 may include, for example, a table, a matrix, a relational database, or any other data storage structure. As shown in FIG. 3, opt-out data 300 may include a plurality of entries 302 corresponding to different user devices 110. In one embodiment, each entry 302 may correspond to an opt-out request received from a user device 110 to opt-out of being tracked online. Each entry 302 may include one or more of a corresponding opt-out value 304, encrypted opt-out value 306, IP address 308, user-agent value 310, hashed user-agent value 312, and/or timestamp 314. For example, if the opt-out system 200 encrypts the opt-out value, each entry 302 may contain the encrypted opt-out value and/or a timestamp.

The timestamp 314 may include information indicating a time and date that the opt-out request was received. Alternatively, or additionally, the timestamp 314 may indicate a time and date the opt-out value was generated and/or sent by a user device 110 the opt-out system 200.

Figure 4:
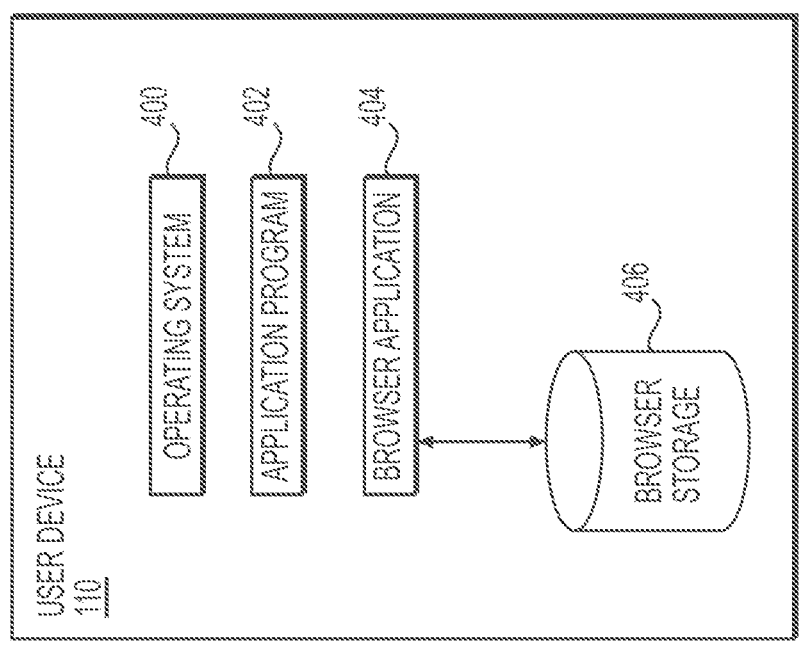
FIG. 4 depicts an exemplary representation of elements of user device that may be stored in memory and executed by a processor of the user device, according to exemplary embodiments of the present disclosure.

FIG. 4 depicts an exemplary representation of elements of user device 110 that may be stored in memory and executed by a processor of user device 110, consistent with the disclosed embodiments. As shown, user device 110 may include (e.g., stored in memory) an operating system 400, one or more application programs 402, and a browser application 404. The processor associated with user device 110 may leverage and execute operating system 400, application programs 402, and browser application 404 in connection with the opt-out response. Web browser application 404 may include any web browser application capable of rendering Internet content provided by publishers 104.

The web browser application 404 may receive the opt-out response including the opt-out value and/or the encrypted opt-out value, and store the opt-out value and/or the encrypted opt-out value in browser storage 406. The web browser application may append an HTTP header of an HTTP request with an opt-out field name having the opt-out value and/or the encrypted opt-out value. For example, the opt-out field name may be "OptOutState:," and the HTTP header may be "OptOutState:<opt-out_value>."

When the web browser application 404 makes an HTTP request, which may consist of an address of a web site requested and HTTP header fields including the user-agent, opt-out value, and/or encrypted opt-out value, the server, such as servers of advertiser 102, publisher 104, ad server 106, and/or data provider 108, may recognize one or more of the opt-out field name, the opt-out value, and/or the encrypted opt-out value. When the opt-out field name, the opt-out value, and/or the encrypted opt-out value is recognized by the server, the server may send an opt-out verification request to the privacy preference state management system 112 via network 114. The opt-out verification request may include the IP address of the user device 110 making the request and the HTTP header fields, including the user agent, the opt-out value, and/or the encrypted opt-out value.

Upon receiving the opt-out verification request, the privacy preference state management system 112 may verify the request based on the verification request and the entries of the opt-out data 300. The privacy preference state management system 112 may determine a geographic area of the IP address of the verification request, and lookup the entry of the opt-out data 300 and compare the stored values of the entry with the determined geographic area and the user agent value of the verification request.

If the verification request is successful, the privacy preference state management system 112 may transmit a verification acknowledgement to the verification requestor. If the verification request is unsuccessful, the privacy preference state management system 112 may transmit a verification failure message. Additionally, or alternatively, the privacy preference state management system 112 may notify the user that the opt-out is no longer valid. For example, the verification acknowledgement may be the privacy preference state management system 112 transmitting an HTTP header including "OptOutState: OK", and the verification failure may be an HTTP header including "OptOutState: Failed."

Figure 5:
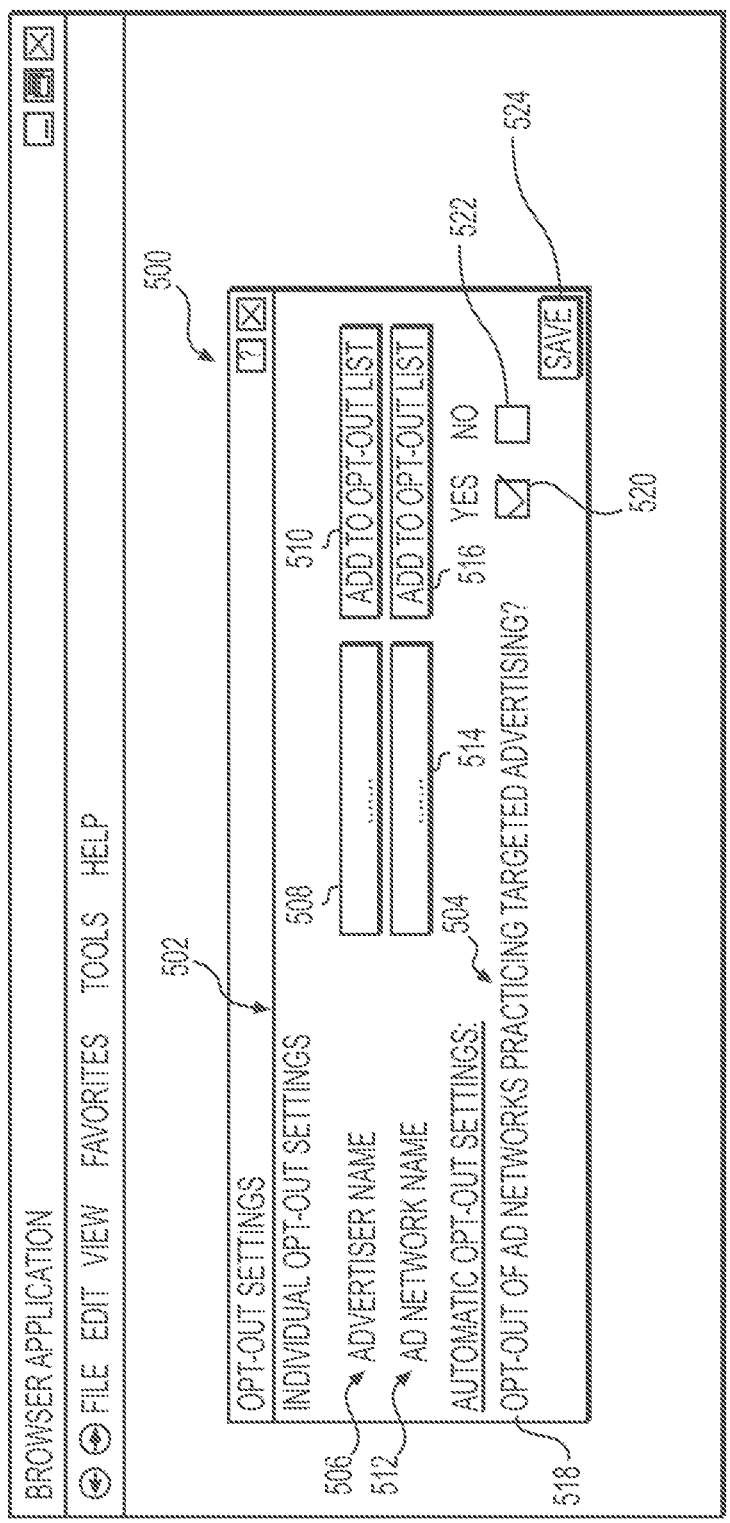
FIG. 5 depicts an exemplary graphical user interface ("GUI") allowing a user to configure opt-out settings, according to exemplary embodiments of the present disclosure.

FIG. 5 depicts an exemplary graphical user interface ("GUI") 500 allowing a user to configure opt-out settings. GUI 500 may include an individual opt-out settings interface 502 and an automatic opt-out settings interface 504. Individual opt-out settings interface 502 may include an option 506 for opting-out of ads based on the name of an advertiser, such as an advertiser 102. In one embodiment, option 506 may include a user interface element 508, such as a text entry box, a drop-down menu, or another such user interface element, allowing the user to select, input, or otherwise provide the name of an advertiser whose ads the user desires to opt-out of receiving. After entering the name of such an advertiser, the user may select an add-to-opt-out-list button 510 to add that particular advertiser to the user's opt-out list, which may be stored as an entry 302 in database 204. Subsequently, as discussed in further detail below, when ads associated with the "blocked" advertiser are requested, the privacy preference state management system 112 may indicate that the user has opted-out of receiving ads from a particular advertiser.

Individual opt-out settings interface 502 may also include an option 512 for opting-out of ads based on the name of an ad network, such as an ad server 106. In one embodiment, option 512 may include a user interface element 514, such as a text entry box, a drop-down menu, or another such user interface element, allowing the user to select, input, or otherwise provide the name of an ad network whose ads the user desires to opt-out of receiving. After entering the name of such an ad network, the user may select an add-to-opt-out-list button 516 to add that particular ad network to the user's opt-out list, which may be stored as an entry 302 in database 204. Subsequently, as discussed in further detail below, when ads associated with the "blocked" advertiser are requested, the privacy preference state management system 112 may indicate that the user has opted-out of receiving ads from the particular ad server.

Automatic opt-out settings interface 504 may include an opt-out option 518. Activation of the opt-out option 518 may facilitate automatically opting-out of advertisers 102, publishers 104, ad servers 106, data providers 108, and/or other entities practicing targeted advertising, user profiling, and/or online behavioral tracking. In one embodiment, option 518 may include a "Yes" user interface element 520, and a "No" user interface element 522 (e.g., check boxes, text entry boxes, drop-down menus, or other such user interface elements) allowing the user to select whether to automatically opt-out of online entities practicing targeted advertising, user profiling, and/or online behavioral tracking. As shown in FIG. 5, opt-out settings GUI 500 may further include an option 524 to save the settings input by the user.

Figure 6:
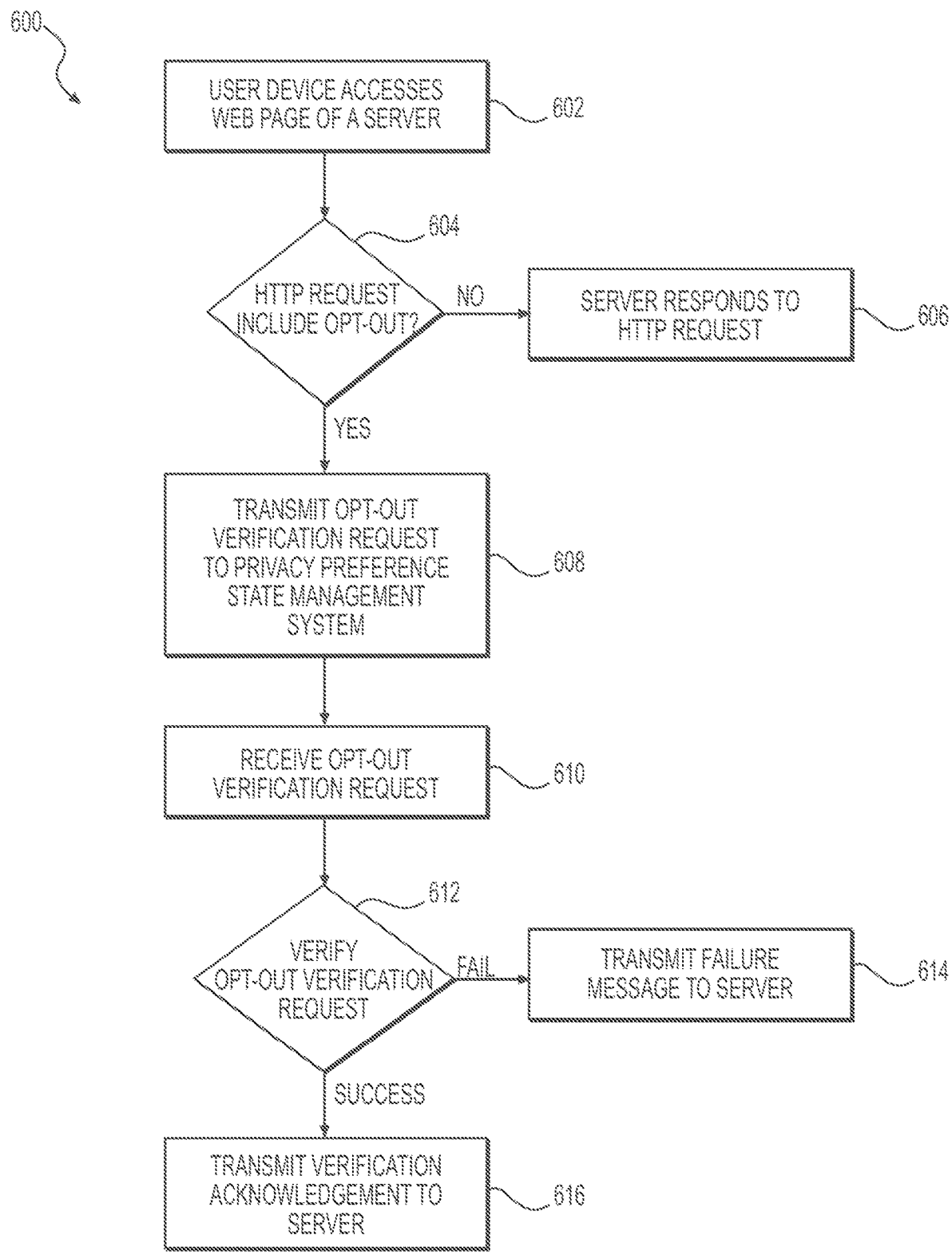
FIG. 6 depicts a flowchart illustrating a privacy preferences state management method, according to exemplary embodiments of the present disclosure.

FIG. 6 depicts a flowchart illustrating a privacy preferences state management method 600. Method 600 may begin at step 602 in which a user device 110 accesses a web page associated with a server, such as a server system of one of advertiser 102, publishers 104, ad server 106, and/or data provider 108. For example, a user of user device 110 may provide input to browser application 404 requesting access to the web page of the publisher 104, such as by directly entering the URL of the web page or by using a search engine to search for and click-through to the web page. In response, browser application 404 may, for example, generate an HTTP request to publisher 104 for the HTML web content associated with the publisher's webpage. The HTTP request may include, for example, an opt-out field name have the opt-out value and/or the encrypted opt-out value.

At step 604, the server may determine whether the HTTP request includes one or more of an opt-out field name, an opt-out value, and/or the encrypted opt-out value. If the server determines that the HTTP request does not include an opt-out field name, an opt-out value, and the encrypted opt-out value, the server may respond to the HTTP request at step 606. If the server determines that the HTTP request includes an opt-out field name, an opt-out value, and the encrypted opt-out value, the server may transmit an opt-out verification request to the privacy preference state management server for verification at step 608. The opt-out verification request may include the opt-out value and/or the encrypted opt-out value, along with the IP address of the user device and the user-agent value field of the HTTP request.

At step 610, the privacy preference state management system receives opt-out verification request. Upon receiving the opt-out verification request, the privacy preference state management system at step 612 may verify the request based on the verification request and entries of opt-out database. The privacy preference state management system 112 may determine a geographic area of the IP address of the verification request, and lookup the entry in the opt-out database and compare the stored values of the entry with the determined geographic area and the user agent value of the verification request.

If the verification request is successful, the privacy preference state management system at step 614 may transmit a verification acknowledgement to the verification requestor. If the verification request is unsuccessful, the privacy preference state management system 616 may transmit a verification failure message. Additionally, or alternatively, the privacy preference state management system may notify the user that the opt-out is no longer valid.

Figure 7:
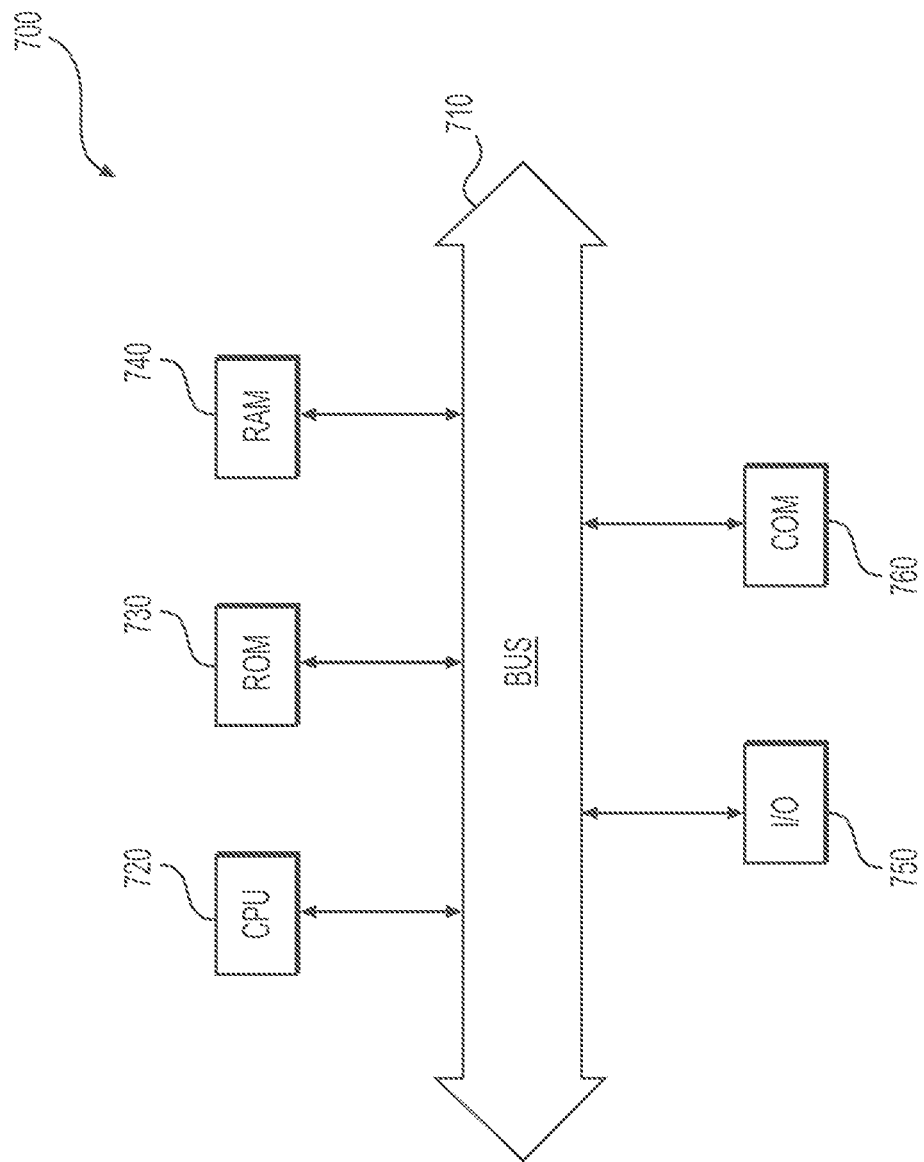
FIG. 7 is a simplified functional block diagram of a computer that may be configured as a device or server for executing the methods of FIG. 6, according to exemplary embodiments of the present disclosure.

FIG. 7 is a simplified functional block diagram of a computer that may be configured as devices, systems, and/or servers for executing the methods, according to exemplary an embodiment of the present disclosure. Specifically, in one embodiment, any of the devices, systems, and/or servers may be an assembly of hardware 700 including, for example, a data communication interface 760 for packet data communication. The platform may also include a central processing unit ("CPU") 720, in the form of one or more processors, for executing program instructions. The platform typically includes an internal communication bus 710, program storage, and data storage for various data files to be processed and/or communicated by the platform such as ROM 730 and RAM 740, although the system 700 often receives programming and data via network communications 760. The server 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for opting-out of targeted advertising in online advertising environments, the method comprising:
    receiving, at a server, over an electronic network, through a graphical user interface (GUI) of a user device, an automatic opt-out request, selected by the user, the automatic opt-out request corresponding to one or more ad networks and a user-agent value of the web browser on the user device;
    hashing, by the server, the user-agent value of the web browser;
    generating, by the server, an opt-out value for the opt-out request based on a location of the user device and the hashed user-agent value, the location determined by an IP address of the user device;
    encrypting, by an encryption system, the opt-out value using asymmetric key pairs;
    verifying, by the server, the opt-out request by comparing the determined location of the user device and an opt-out database; and
    based on verifying the opt-out request, transmitting, by the server, to the user device, an opt-out verification acknowledgment and opt-out cookies corresponding to the selected one or more ad networks, the opt-out cookies configured to prevent online tracking of the user device.

2. The computer-implemented method of claim 1, wherein accessing the opt-out database is based on at least the encrypted opt-out value.

3. The computer-implemented method of claim 1, further comprising:
    decrypting the encrypted opt-out value, wherein accessing the opt-out database is further based on the decrypted opt-out value.

4. The computer-implemented method of claim 1, wherein verifying the opt-out request includes:
    comparing, by the server, the determined location to a stored location of an entry of an opt-out database associated with at least the encrypted opt-out value.

5. The computer-implemented method of claim 1, wherein the transmitting the opt-out verification acknowledgment includes a verification failure message when the user device is determined to have not opted-out of receiving targeted advertising.

6. The computer-implemented method of claim 1, further comprising:
    storing, by the server, in the opt-out database, a timestamp indicating when the opt-out request was received in an entry of the user device based on at least one HTTP header field of the received opt-out request.

7. The computer-implemented method of claim 6, wherein the timestamp further indicates a time and date the opt-out value was generated.

8. A system for opting-out of targeted advertising in online advertising environments, the system comprising:
- a data storage device storing instructions for opting-out of targeted advertising in online advertising environments in an electronic storage medium; and
- a processor configured to execute the instructions to perform a method including:
  - receiving, at a server, over an electronic network, through a graphical user interface (GUI) of a user device, an automatic opt-out request, selected by the user, the automatic opt-out request corresponding to one or more ad networks and a user-agent value of the web browser on the user device;
  - hashing, by the server, the user-agent value of the web browser;
  - generating, by the server, an opt-out value for the opt-out request based on a location of the user device and the hashed user-agent value, the location determined by an IP address of the user device;
  - encrypting, by an encryption system, the opt-out value using asymmetric key pairs;
  - verifying, by the server, the opt-out request by comparing the determined location of the user device and an opt-out database; and
  - based on verifying the opt-out request, transmitting, by the server, to the user device, an opt-out verification acknowledgment and opt-out cookies corresponding to the selected one or more ad networks, the opt-out cookies configured to prevent online tracking of the user device.

9. The system of claim 8, wherein accessing the opt-out database is based on at least the encrypted opt-out value.

10. The system of claim 8, further comprising:
decrypting the encrypted opt-out value, wherein accessing the opt-out database is further based on the decrypted opt-out value.

11. The system of claim 8, wherein verifying the opt-out request includes:
comparing, by the server, the determined location to a stored location of an entry of an opt-out database associated with at least the encrypted opt-out value.

12. The system of claim 8, wherein the transmitting the opt-out verification acknowledgment includes a verification failure message when the user device is determined to have not opted-out of receiving targeted advertising.

13. The system of claim 8, wherein the system is further configured for:
storing, by the server, in the opt-out database, a timestamp indicating when the opt-out request was received in an entry of the user device based on at least one HTTP header field of the received opt-out request.

14. The system of claim 8, wherein accessing the opt-out database is based on at least the encrypted opt-out value.

15. A non-transitory machine-readable medium storing instructions that, when executed by a computing system, causes the computing system to perform a method for opting-out of targeted advertising in online advertising environments, the method including:
- receiving, at a server, over an electronic network, through a graphical user interface (GUI) of a user device, an automatic opt-out request, selected by the user, the automatic opt-out request corresponding to one or more ad networks and a user-agent value of the web browser on the user device;
- hashing, by the server, the user-agent value of the web browser;
- generating, by the server, an opt-out value for the opt-out request based on a location of the user device and the hashed user-agent value, the location determined by an IP address of the user device;
- encrypting, by an encryption system, the opt-out value using asymmetric key pairs;
- verifying, by the server, the opt-out request by comparing the determined location of the user device and an opt-out database; and
- based on verifying the opt-out request, transmitting, by the server, to the user device, an opt-out verification acknowledgment and opt-out cookies corresponding to the selected one or more ad networks, the opt-out cookies configured to prevent online tracking of the user device.

16. The non-transitory machine-readable medium of claim 15, the method further comprising:
decrypting the encrypted opt-out value, wherein accessing the opt-out database is further based on the decrypted opt-out value.

17. The non-transitory machine-readable medium of claim 15, wherein the transmitting the opt-out verification acknowledgment includes a verification failure message when the user device is determined to have not opted-out of receiving targeted advertising.

18. The non-transitory machine-readable medium of claim 15, the method further comprising:
storing, by the server, in the opt-out database, a timestamp indicating when the opt-out request was received in an entry of the user device based on at least one HTTP header field of the received opt-out request.

19. The non-transitory machine-readable medium of claim 18, wherein the timestamp further indicates a time and date the opt-out value was generated.

20. The non-transitory machine-readable medium of claim 15, wherein accessing the opt-out database is based on at least the encrypted opt-out value.

* * * * *